United States Patent [19]

Groves

[11] Patent Number: 4,613,846

[45] Date of Patent: Sep. 23, 1986

[54] LIGHT SYSTEM FOR TRUCKS

[76] Inventor: Gerald M. Groves, 1311 Spruce, Southgate, Mich. 48195

[21] Appl. No.: 501,096

[22] Filed: Jun. 6, 1983

[51] Int. Cl.$^4$ .............................................. B60Q 1/00
[52] U.S. Cl. ...................................... 340/106; 340/74; 340/79; 340/102
[58] Field of Search .................. 340/107, 106, 74, 70, 340/79, 102

[56] References Cited

U.S. PATENT DOCUMENTS

| | | | |
|---|---|---|---|
| 2,400,655 | 5/1946 | Saia | 340/107 |
| 2,975,401 | 3/1961 | Shupe | 340/102 |
| 3,123,802 | 3/1964 | Priesemuth | 340/79 |
| 3,441,906 | 4/1969 | Nielsen | 340/74 |
| 3,622,980 | 11/1971 | Elledge | 340/87 |
| 3,648,101 | 3/1972 | Suzuki | 315/82 |
| 3,733,515 | 5/1973 | Parkes | 315/83 |
| 4,195,281 | 3/1980 | Bell | 340/79 |

FOREIGN PATENT DOCUMENTS 2945733  5/1981  Fed. Rep. of Germany ........ 340/74

Primary Examiner—John W. Caldwell, Sr.
Assistant Examiner—Jeffery A. Brier
Attorney, Agent, or Firm—Harness, Dickey & Pierce

[57] ABSTRACT

A passing signal light system is shown in form for retrofit installation on trucks or the like and includes a panel with recesses for one or more amber system indicating light units and two or more green or blue signal light units along with a switch for directing current to either the amber or the green/blue light units and a flasher that permits only pulsating current to reach the green/blue light units.

1 Claim, 3 Drawing Figures

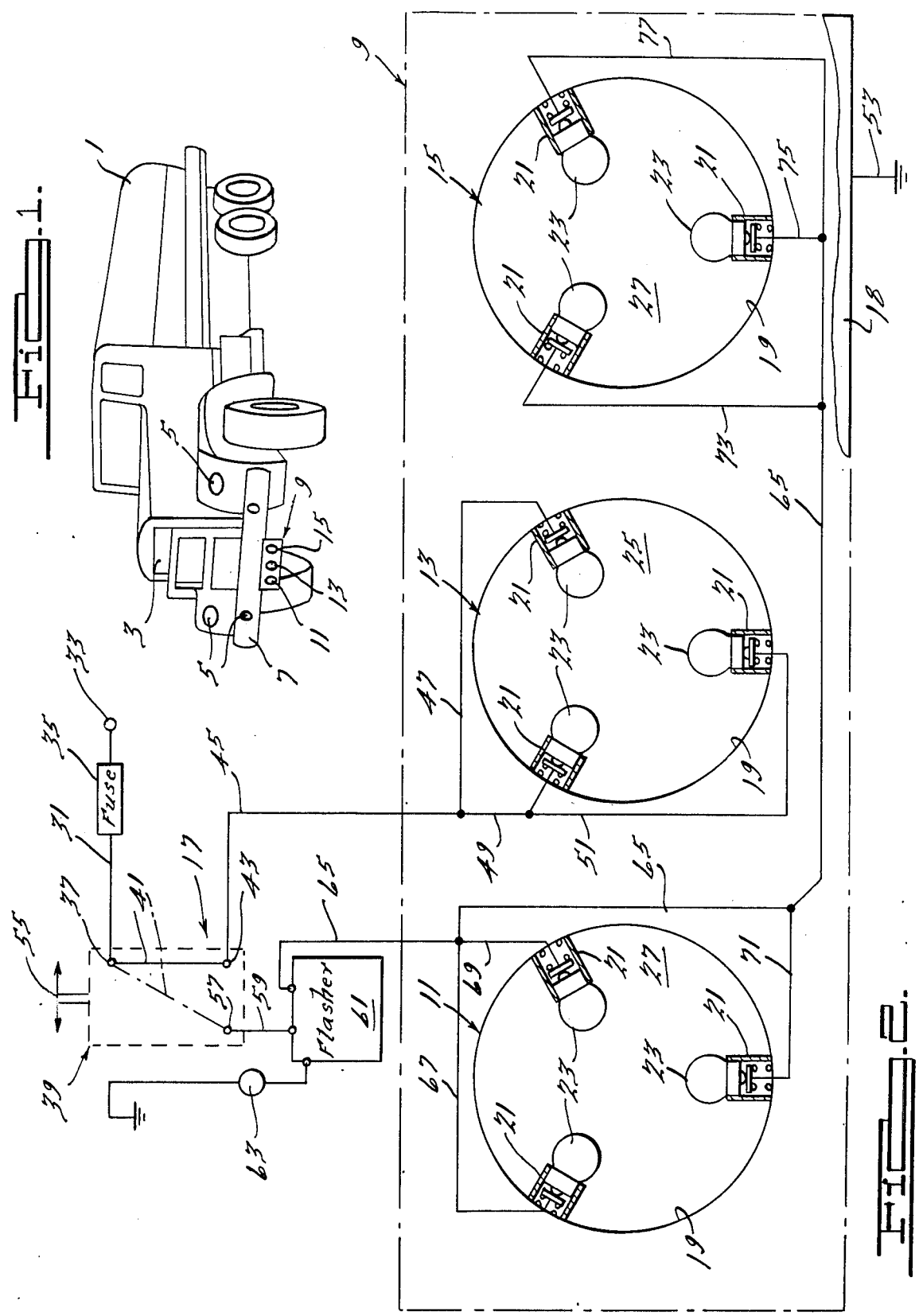

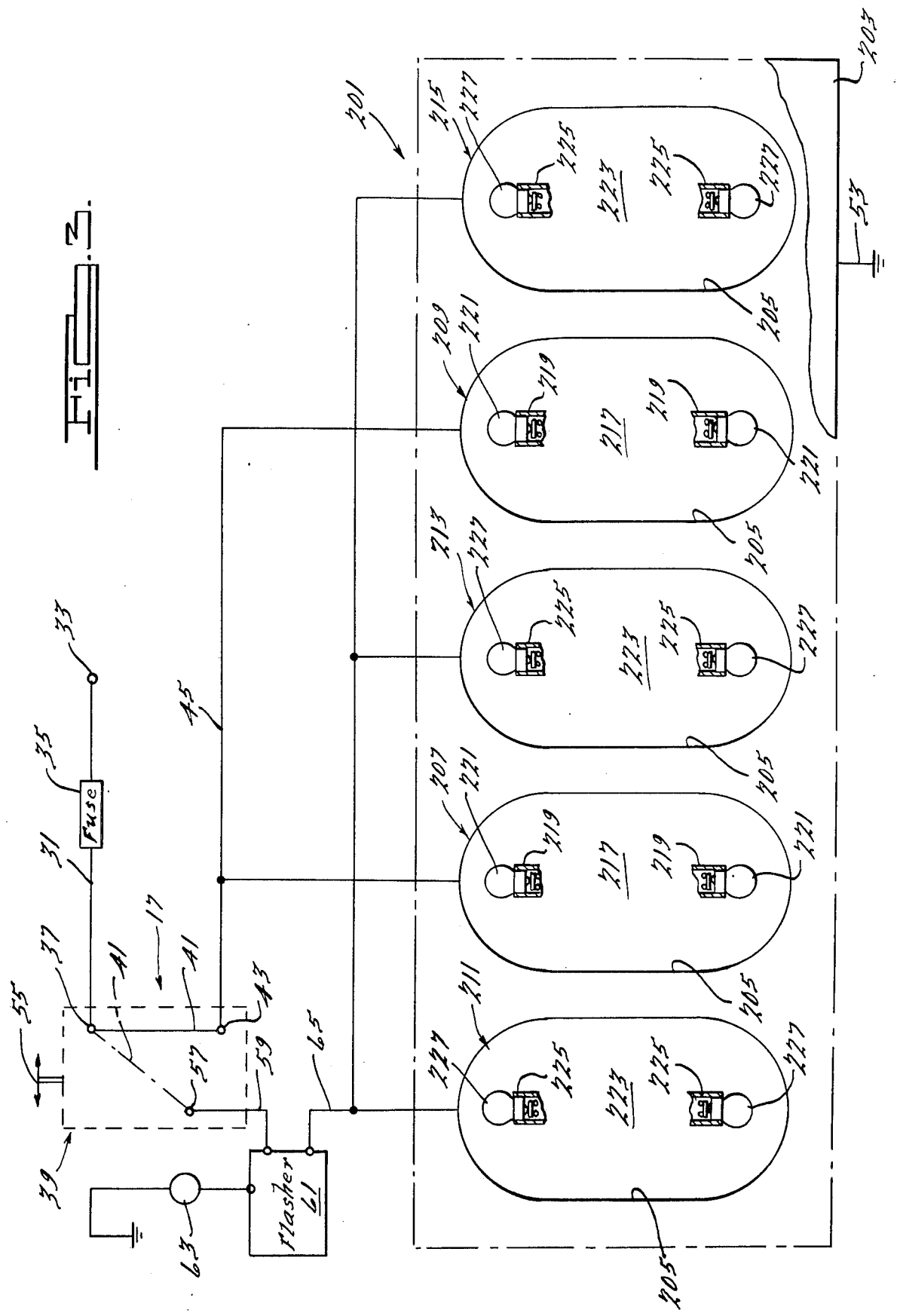

LIGHT SYSTEM FOR TRUCKS

BACKGROUND OF THE INVENTION

It is common practice among drivers of over-the-road equipment, such as trucks, buses, tractors, R.V. equipment, and the like (referred to herein as "trucks"), to assist drivers behind them to pass their vehicles. They do this by flashing their headlights, and this means that the high beams of the headlights are intermittently operated or flashed to indicate an "all-clear" to the passing driver. Truch high beams are so powerful that they can temporarily blind the passing driver, through reflection in his mirrors, or drivers approaching the passed truck on the opposite side of the road. Thus, what is intended to promote safety in passing can actually become a hazard if the flashing high beams interfere with the vision of another driver.

BRIEF SUMMARY OF THE INVENTION

It is the purpose of the invention to promote safer passing of over-the-road vehicles. The invention accomplishes this purpose by means of a special lighting system that is actuated by the driver of the vehicle passing passed to indicate to the passing driver that there is a "clear-for-passing" condition. The invention differs from common practice, and from the system in U.S. Pat. No. 3,648,101, issued Mar. 7, 1972, entitled "Passing Signals for Automobiles", in utilizing a special set of lights that are mounted on the front of the vehicle.

Preferably, the special set of lights includes one or more amber lights which are "on" when the ignition is "on" and one or more signal lights (preferably green or blue in color) which are turned "on" by the driver to receive current through a flasher device so that they are intermittently illuminated. The amber lights are preferably disconnected when the signal lights are energized. The flashing green or blue lights therefore can be used by the driver to signal an "all-clear" condition to the passing driver.

DESCRIPTION OF THE DRAWINGS

FIG. 1 is a perspective view of a truck having a retrofit three-light passing signal light panel in accordance with one form of the invention mounted on the front bumper;

FIG. 2 is a front elevation, somewhat schematic and broken away and with illustrative circuitry added, of the light panel of FIG. 1; and FIG. 3 is a view similar to that of FIG. 2 showing a five-light panel and light units of a different configuration.

DESCRIPTION OF THE INVENTION

Over-the-road equipment in the form of a truck 1 has a front end 3 with conventional headlights 5 and a front bumper 7. In accordance with the invention, a passing signal light panel 9 is mounted on the front end 3. In FIG. 1, the panel 9 is attached in retrofit by appropriate fasteners to the front bumper 7. The panel 9 has three light units 11, 12, and 15 which are operatively connected by appropriate circuitry 17 (schematically illustrated in FIG. 2) into the electrical system of the vehicle 1.

The panel 9 comprises a flat member or board 18 which has three recesses 19 to receive the three light units 11, 13, and 15, the units being of an appropriate construction but preferably each including three sockets 21 whereby three bulbs 23 (e.g., size #89) may be incorporated into each unit. Preferably the center unit 13 has an amber lens 25 and the end units 11 and 15 each have a green or blue (i.e., "go-ahead" colors) lens 27. The three bulbs in each light unit are preferably wired in parallel so that the unit will continue to function even if two of the bulbs burn-out or become inoperative.

The illustrative circuitry 17 includes a lead 31 that is connected to the accessory terminal 33 of the ignition switch (not shown) for the vehicle 1. Current therefore flows in lead 31 when the ignition is "on". Lead 31, which may include a fuse or circuit breaker 35, is connected to terminal 37 of a driver-operated manual switch 39. Terminal 37 is connected by movable and normally closed conductive switch element 41 to a terminal 43 that connects to the amber light unit 13. For this purpose a conductive wire 45 is attached to terminal 43 and to it are connected three leads 47, 49, and 51, one for each of the three bulb sockets 21 which are appropriately grounded to the panel 18 which is itself grounded as indicated at 53. When switch 39 is in the "off" position (i.e. full line position in FIG. 2) current flows to the unit 13 and amber lights are "on" if the ignition switch is "on". This serves as an indication that vehicle 1 has the present passing signal lighting system.

The switch 39 may, for example, be mounted on the dashboard of the vehicle 1 and have a manually grasped switch handle or lever 55 for moving switch element 41 between terminal 43 and a second terminal 57. When the switch is connected to terminal 57 current no longer flows through conductor 45 and the amber light unit 13 is turned "off". Current at terminal 57 follows a conductor 59 to a suitable flasher switch unit 61 which preferably also includes an audio and/or visual signal device 63 to indicate that current is flowing to it. Current leaving flasher 61 follows conductor 65 to operate the green or blue units 11 and 15. Leads 67, 69, and 71 connect conductor 65 to the three sockets 21 in unit 11, the sockets being properly grounded in panel board 18. Leads 73, 75, and 77 connect conductor 65 to the three grounded bulb sockets 21 in the unit 15.

Thus, when the switch 55 is operated to move switch element 41 to the dotted position of FIG. 2 current will intermittently flow to light units 11 and 15 and they will emit flashing blue or green light to give an "all-clear" sign to a passing driver. When the driver is ready to terminate flashing he can move switch handle 55 so that switch element 41 goes back to its normal position in contact with terminal 43, thereby disconnecting light units 11 and 15 and activating the amber unit 13.

The embodiment of FIG. 3 has a slightly different light panel 201 than the panel 9 but its electrical circuitry is essentially the same and is therefore given the same reference numerals as for panel 9. In panel 201 there is a grounded board 203 for retrofit installation in the same manner as panel 9. It has five oblong recesses 205 to receive two amber light units 207 and 209 and three flashing green or blue light units 211, 213, and 215, preferably disposed with respect to the amber units in the manner shown in FIG. 3.

The unis 207 and 209 have amber lenses 217 and each contains two bulb sockets 219 and bulbs 221 located, preferably, as shown. Similarly, the light units 211, 213, and 215 have green or blue lenses 223 and each contains two bulb sockets 225 and bulbs 227. Electrical circuitry is such that the bulbs 221 and 227 in each unit operate in parallel so that if one fails the unit is still functional.

Operation of the system of FIG. 3 is essentially the same as that of FIG. 2 and need not be described. Because of the increased number of light units there is a reduced possibility of functional failure and somewhat greater visibility in the system of FIG. 3 as compared with that of FIG. 2.

While the systems described could, broadly, be incorporated as original vehicle equipment, I have shown them as retrofit installations since such installations will expedite usage by several years and bring it within the reach of all concerned vehicle owners at a much earlier date. It is evident that usage of he systems will enable vehicle drivers to practice courtesy of the road without by such practice inadvertently creating a hazard as is now often the case when high powered high beams are flashed to assist passing drivers.

Modifications in the details shown may be made without departing from the spirit and scope of the invention.

I claim:

1. A passing signal system for a highway vehicle to obviate the need for flashing high beam headlights to tell a passing driver it is safe to complete passing comprising;

a panel adapted to be attached to the front end of said highway vehicle, said panel having recesses to receive three light units, a first light unit having an amber lens, a second and third light unit having green lenses, each said light unit having a plurality of bulbs wired in parallel, circuit means for connection to the electrical system of the vehicle and including means to operate said light units when the vehicle ignition system is "on", a flasher in said circuit means connected to said bulbs of said second light unit and said bulbs of said third light unit to flash said bulbs of said second light unit and said bulbs of said third light unit when energized, a driver operated switch in said circuit means which alternatively energizes either said bulbs of said first light unit to inform passing drivers that said system exists and is energized or said flasher to flash said bulbs of said second light unit and said bulbs of said third light unit to inform passing drivers that there is a clear condition to complete passing of said highway vehicles and a signal having an audio and/or visual output in said circuit means energized by current flow to the flasher to indicate to the driver by such output that there is current flow to the flasher.

* * * * *